INVENTOR
GLENMORE L. SHELTON, JR

BY Sughrue, Rothwell, Mion & Zinn
ATTORNEYS

PATTERN f(x,y)

AUTOCORRELATION FUNCTION $D_R(x',y')$

NORMALIZED AUTOCORRELATION FUNCTION $Z_R(x',y')$

| | | | | |
|---|---|---|---|---|
| | | 5 | 0 | 0 |
| 0 | 0 | 4 | 0 | 0 |
| 0 | 0 | 3 | 0 | 0 |
| 0 | 0 | 2 | 0 | 0 |
| 0 | 0 | 1 | 0 | 0 |

| | | | | |
|---|---|---|---|---|
| | | 0.5423 | 0 | 0 |
| 0 | 0 | 0.4339 | 0 | 0 |
| 0 | 0 | 0.3254 | 0 | 0 |
| 0 | 0 | 0.2169 | 0 | 0 |
| 0 | 0 | 0.1085 | 0 | 0 |

| | | | | |
|---|---|---|---|---|
| | | 8 | 2 | 2 |
| 0 | 3 | 2 | 2 | 1 |
| 1 | 2 | 1 | 2 | 0 |
| 1 | 1 | 3 | 1 | 1 |
| 0 | 1 | 1 | 1 | 0 |

| | | | | |
|---|---|---|---|---|
| | | 0.6172 | 0.1543 | 0.1543 |
| 0 | 0.2315 | 0.1543 | 0.1543 | 0.0772 |
| 0.0772 | 0.1543 | 0.0772 | 0.1543 | 0 |
| 0.0772 | 0.0772 | 0.2315 | 0.0772 | 0.0772 |
| 0 | 0.0772 | 0.0772 | 0.0772 | 0 |

| | | | | |
|---|---|---|---|---|
| | | 7 | 2 | 0 |
| 1 | 2 | 0 | 2 | 1 |
| 0 | 1 | 3 | 1 | 0 |
| 1 | 1 | 0 | 1 | 1 |
| 0 | 1 | 2 | 1 | 0 |

| | | | | |
|---|---|---|---|---|
| | | 0.6417 | 0.1833 | 0 |
| 0.0917 | 0.1833 | 0 | 0.1833 | 0.0917 |
| 0 | 0.0917 | 0.2750 | 0.0917 | 0 |
| 0.0917 | 0.0917 | 0 | 0.0917 | 0.0917 |
| 0 | 0.0917 | 0.1833 | 0.0917 | 0 |

| | | | | |
|---|---|---|---|---|
| | | 8 | 3 | 1 |
| 1 | 3 | 5 | 2 | 1 |
| 1 | 1 | 3 | 2 | 1 |
| 0 | 0 | 2 | 1 | 0 |
| 0 | 0 | 1 | 0 | 0 |

| | | | | |
|---|---|---|---|---|
| | | 0.5547 | 0.2080 | 0.0693 |
| 0.0693 | 0.2080 | 0.3467 | 0.1387 | 0.0693 |
| 0.0693 | 0.0693 | 0.2080 | 0.1387 | 0.0693 |
| 0 | 0 | 0.1387 | 0.0693 | 0 |
| 0 | 0 | 0.0693 | 0 | 0 |

| | | | | |
|---|---|---|---|---|
| | | 9 | 4 | 1 |
| 2 | 2 | 2 | 2 | 1 |
| 1 | 3 | 4 | 2 | 1 |
| 0 | 0 | 2 | 2 | 1 |
| 1 | 2 | 2 | 1 | 0 |

| | | | | |
|---|---|---|---|---|
| | | 0.5704 | 0.2535 | 0.0634 |
| 0.1267 | 0.1267 | 0.1267 | 0.1267 | 0.0634 |
| 0.0634 | 0.1901 | 0.2535 | 0.1267 | 0.0634 |
| 0 | 0 | 0.1267 | 0.1267 | 0.0634 |
| 0.0634 | 0.1267 | 0.1267 | 0.0634 | 0 |

PATTERN f(x,y) — AUTOCORRELATION FUNCTION $D_R(x',y')$ — NORMALIZED AUTOCORRELATION FUNCTION $Z_R(x',y')$

| | | | | |
|---|---|---|---|---|
| | | 9 | 3 | 2 |
| 1 | 4 | 4 | 2 | 2 |
| 1 | 3 | 2 | 3 | 1 |
| 1 | 1 | 2 | 1 | 0 |
| 1 | 1 | 1 | 0 | 0 |

| | | | | |
|---|---|---|---|---|
| | | 0.5614 | 0.1871 | 0.1248 |
| 0.0624 | 0.2495 | 0.2495 | 0.1248 | 0.1248 |
| 0.0624 | 0.1871 | 0.1248 | 0.1871 | 0.0624 |
| 0.0624 | 0.0624 | 0.1248 | 0.0624 | 0 |
| 0.0624 | 0.0624 | 0.0624 | 0 | 0 |

| | | | | |
|---|---|---|---|---|
| | | 7 | 2 | 1 |
| 0 | 1 | 3 | 1 | 1 |
| 0 | 2 | 2 | 1 | 0 |
| 0 | 2 | 1 | 1 | 0 |
| 0 | 1 | 1 | 1 | 0 |

| | | | | |
|---|---|---|---|---|
| | | 0.6417 | 0.1833 | 0.0917 |
| 0 | 0.0917 | 0.2750 | 0.0917 | 0.0917 |
| 0 | 0.1833 | 0.1833 | 0.0917 | 0 |
| 0 | 0.1833 | 0.0917 | 0.0917 | 0 |
| 0 | 0.0917 | 0.0917 | 0.0917 | 0 |

| | | | | |
|---|---|---|---|---|
| | | 11 | 4 | 4 |
| 2 | 4 | 4 | 4 | 2 |
| 1 | 2 | 4 | 2 | 1 |
| 2 | 2 | 4 | 2 | 2 |
| 1 | 2 | 3 | 2 | 1 |

| | | | | |
|---|---|---|---|---|
| | | 0.5180 | 0.1884 | 0.1884 |
| 0.0942 | 0.1884 | 0.1884 | 0.1884 | 0.0942 |
| 0.0471 | 0.0942 | 0.1884 | 0.0942 | 0.0471 |
| 0.0942 | 0.0942 | 0.1884 | 0.0942 | 0.0942 |
| 0.0471 | 0.0942 | 0.1413 | 0.0942 | 0.0471 |

| | | | | |
|---|---|---|---|---|
| | | 10 | 4 | 3 |
| 2 | 2 | 6 | 3 | 3 |
| 1 | 2 | 5 | 3 | 3 |
| 0 | 0 | 2 | 1 | 2 |
| 0 | 0 | 1 | 1 | 1 |

| | | | | |
|---|---|---|---|---|
| | | 0.5038 | 0.2015 | 0.1511 |
| 0.1008 | 0.1008 | 0.3023 | 0.1511 | 0.1511 |
| 0.0504 | 0.1008 | 0.2519 | 0.1511 | 0.1511 |
| 0 | 0 | 0.1008 | 0.0504 | 0.1008 |
| 0 | 0 | 0.0504 | 0.0504 | 0.0504 |

| | | | | |
|---|---|---|---|---|
| | | 8 | 0 | 3 |
| 2 | 2 | 4 | 2 | 2 |
| 1 | 2 | 2 | 2 | 1 |
| 0 | 2 | 0 | 2 | 0 |
| 0 | 0 | 1 | 0 | 0 |

| | | | | |
|---|---|---|---|---|
| | | 0.5774 | 0 | 0.2165 |
| 0.1443 | 0.1443 | 0.2887 | 0.1443 | 0.1443 |
| 0.0722 | 0.1443 | 0.1443 | 0.1443 | 0.0722 |
| 0 | 0.1443 | 0 | 0.1443 | 0 |
| 0 | 0 | 0.0722 | 0 | 0 |

Dec. 7, 1965 G. L. SHELTON, JR 3,222,638

SPECIMEN IDENTIFICATION APPARATUS UTILIZING OPTICAL AUTOCORRELATION FUNCTIONS

Filed Dec. 4, 1961 7 Sheets-Sheet 6

Dec. 7, 1965 G. L. SHELTON, JR 3,222,638

SPECIMEN IDENTIFICATION APPARATUS UTILIZING OPTICAL AUTOCORRELATION FUNCTIONS

Filed Dec. 4, 1961 7 Sheets-Sheet 7

United States Patent Office 3,222,638

Patented Dec. 7, 1965

3,222,638

SPECIMEN IDENTIFICATION APPARATUS UTILIZING OPTICAL AUTOCORRELATION FUNCTIONS

Glenmore L. Shelton, Jr., Carmel, N.Y., assignor to International Business Machines Corporation, New York, N.Y., a corporation of New York Filed Dec. 4, 1961, Ser. No. 156,832
10 Claims. (Cl. 340—146.3)

This invention relates generally to specimen identification apparatus and, more particularly, to such apparatus wherein the theory of optical autocorrelation functions is utilized to identify the specimen.

Prior art specimen identification devices generally utilize direct comparison of the specimen and reference patterns. In such devices either vertical or horizontal misregistration of the specimen affects the comparison and, furthermore, the document containing the specimen, such as a printed character, must be held in a fixed position during the identification.

The present invention utilizes the comparison of the component elements of autocorrelation functions for specimen identification. The autocorrelation function of a function provides a measure of the correlation of the function with itself through various displacements. Autocorrelation function comparison is inherently registration invariant and, consequently, is insensitive to either vertical or horizontal misregistration of the specimen or character to be identified, thereby allowing identification to take place while the document containing the character is in motion. Furthermore, the identification of an imperfect specimen or character is not hampered when autocorrelation functions of the specimens, rather than the specimens themselves, are used in the comparison.

A broad object of this invention is to provide specimen identification apparatus utilizing autocorrelation function comparison wherein the component elements of the autocorrelation function of a specimen to be identified is electrooptically generated.

Another important object of this invention is to provide specimen identification apparatus utilizing optical scanning means which simultaneously scans in parallel several elements of the specimen to provide an output indicative of the autocorrelation function of the specimen.

Another object of this invention is to couple optically the output of the scanning means to a plurality of photoelectric devices which generate digital signals corresponding to component elements of the autocorrelation function of the specimen.

Still another object is to couple the digital signals produced by the photoelectric elements to light transmitting devices which consequently transmit a light pattern which forms a digitized optical autocorrelation function of the specimen.

A further object is to provide means for comparing the component elements of the optical autocorrelation function of a specimen with a plurality of digitized reference autocorrelation functions in order to identify the specimen.

Briefly, in accordance with one embodiment of this invention, a specimen displayed on a matrix is sensed a column at a time with all the matrix elements in each column being sensed in parallel simultaneously. Sensing is accomplished by means of an optical scanner whose dimensions correspond to the dimensions of the specimen. The scanner consists of light conducting rods of at least the same number as there are elements in the specimen matrix. A light image of the specimen is conducted by these rods and is logically coupled to a plurality of photoelectric devices which are interconnected in a logical manner to provide digital output signals corresponding to the component elements of the autocorrelation function of the specimen. These digital signals are then used to energize suitable lamps. The lamps are arranged in groups, and the light from each group is combined to form a digitized representation of grouped or partially summed component elements of the specimen autocorrelation function in the form of a light pattern having an intensity proportional to such grouped or partially summed component elements. This pattern is then compared with reference masks whose light transmissibility corresponds to digitized patterns of reference autocorrelation functions. The light transmitted by each of the masks during the time required to scan the specimen is summed and applied to photoelectric devices whose electrical outputs are then applied to a maximum signal indicator which provides a signal indicative of the mask transmitting the most light, thereby identifying the reference mask which most closely matches the specimen.

In another embodiment, the partial summing or grouping step is eliminated and the outputs of the light transmitting devices are uniformly spaced so that the transmitted light forms a digitized optical pattern of the component elements of the specimen autocorrelation function. However, since there are fewer light transmitting devices than in the first embodiment, each light transmitting device is energized more often and a longer period of time is required to sum or integrate the light signals generated by the light transmitting devices and passed by the reference masks. The reference pattern most closely matching the specimen transmits the most light thereby identifying the specimen in the same manner set forth in the foregoing brief description of the first embodiment.

Other objects of this invention will be pointed out in the following description and claims and illustrated in the accompanying drawings which disclose, by way of example, the principle of the invention and the best mode which has been contemplated of applying that principle.

In the drawings:

FIGURES 1*a*, 1*b* and 1*c* show a schematic diagram of the optical scanning arrangement, photoelectric logic circuits, and light transmitting devices which form a digitized optical pattern of a specimen autocorrelation function in accordance with the first embodiment of this invention;

FIGURES 2*a* and 2*b* show the structure and physical relationship of the optical scanner and typical specimens to be identified;

FIGURE 3 illustrates the second embodiment wherein the light transmitting devices form a digitized optical pattern and also illustrates the details of the reference masks and other components necessary to make an optical comparison to identify a specimen;

FIGURES 4*a* and 4*b* illustrate the ten Arabic numerals displayed on a 3 x 5 matrix together with charts of their actual and normalized autocorrelation functions;

As previously stated, the autocorrelation function of the specimen is generated electrooptically and compared optically with autocorrelation functions of reference patterns to identify the specimen. The autocorrelation function is a measure of the correlation of a function with itself and is thus inherently registration invariant. If the specimen to be identified is considered to be a matrix of discrete areas having coordinates $(x, y)$ that are predominantly black, or predominantly white, then depending upon the positions of the lines that the specimen comprises, there is a function $f(x, y)$ that is "1" for each instance where the area about the coordinates $(x, y)$ is occupied by the specimen and "0" where not occupied. The autocorrelation function defines the number of pairs of occupied areas separated by a given distance in a given direction, over all distances and directions. If $(x, y)$ is a point on the pattern, and $(x+x', y+y')$ is another point on the pattern separated from the point $(x, y)$ by $(x', y')$, then the product or component element $$(x, y)(x+x', y+y')=1$$

only where both points are occupied by the specimen. Since this procedure is performed on every pair of points in the pattern, the autocorrelation function $D(x', y')$ is defined as the summation of these component elements:

$$D(x', y')=\sum_{x,y} f(x, y)f(x+x', y+y')$$

The autocorrelation function $D_S(x', y')$ of the specimen S is then optically compared, element-by-element, with the autocorrelation functions $Z_r(x', y')$ of all reference patterns R, where $Z_{Rn}(x', y')$ of reference pattern R*n* is defined as:

$$Z_{Rn}(x', y')=\frac{D_{Rn}(x', y')}{\left[\sum_{x', y'} D^2_{Rn}(x', y')\right]^{1/2}}$$

The denominator of the preceding equation is the normalization factor. The comparison $S_{S, Rn}$ of $D_S(x', y')$ and $Z_{Rn}(x', y')$ is effected as follows:

$$S_{S, Rn}=\sum_{x', y'} D_S(x', y')Z_{Rn}(x', y')$$

The reference pattern *Rn* that produces the largest comparison sum determines the identification of the specimen. Either each comparison sum or the reference pattern autocorrelation function itself must be normalized to guarantee that the largest sum will be indicative of the reference pattern that is most similar to the specimen. A Schwartz inequality, as found on page 417 of a text authored by Wilfred Kaplan, entitled Advanced Calculus, 1952, published by Addison-Wesley Publishing Co., may be used to show that, $$\sum_{x', y'} \frac{D_S(x', y')\cdot D_{Rn}(x', y')}{\left[\sum_{x', y'} D^2_{Rn}(x', y')\right]^{1/2}}$$

is a maximum when $D_S(x', y')=D_{Rn}(x', y')$.

Figure 2A:
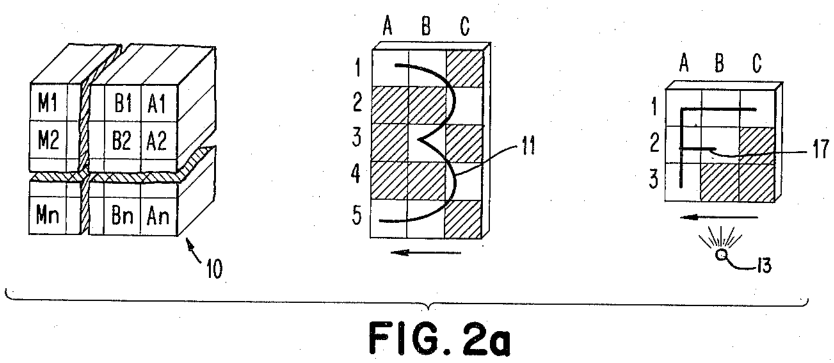
Figure 2B:
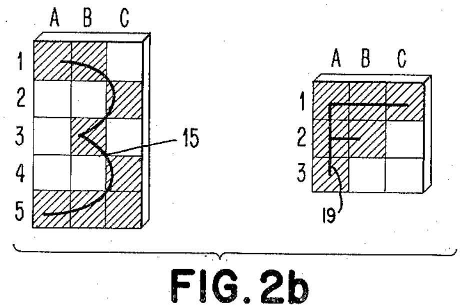
Figure 3:
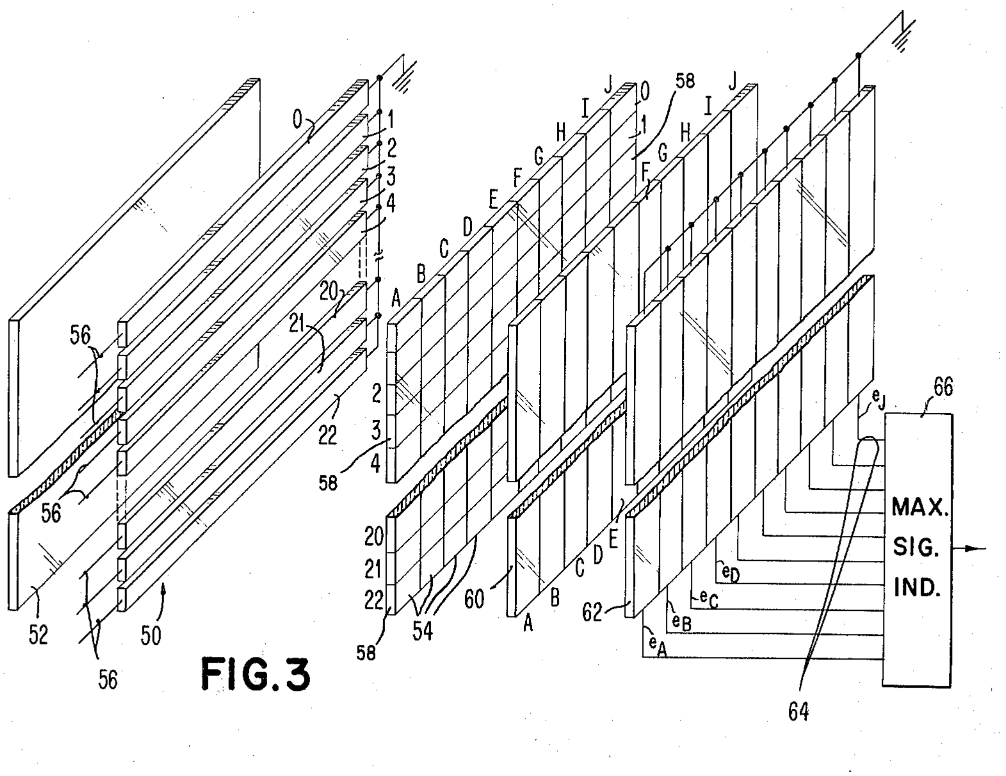

Before describing the apparatus shown in FIGURES 1–3 and in order to provide a clear illustration of the principles of the invention which are embodied therein, let us first consider the manual generation of autocorrelation functions as described in co-pending application Serial No. 93,070, filed March 3, 1961, by Lawrence P. Horwitz and Glenmore L. Shelton, Jr. and assigned to the same assignee as the instant application.

Since the autocorrelation function of a specimen is a measure of the correlation of the specimen with itself, it may be generated by comparing the specimen to be autocorrelated with itself, shifted in all directions and over all distances.

Figures 6, 7, 8, 9, 10, 11, 12, 13, 14:
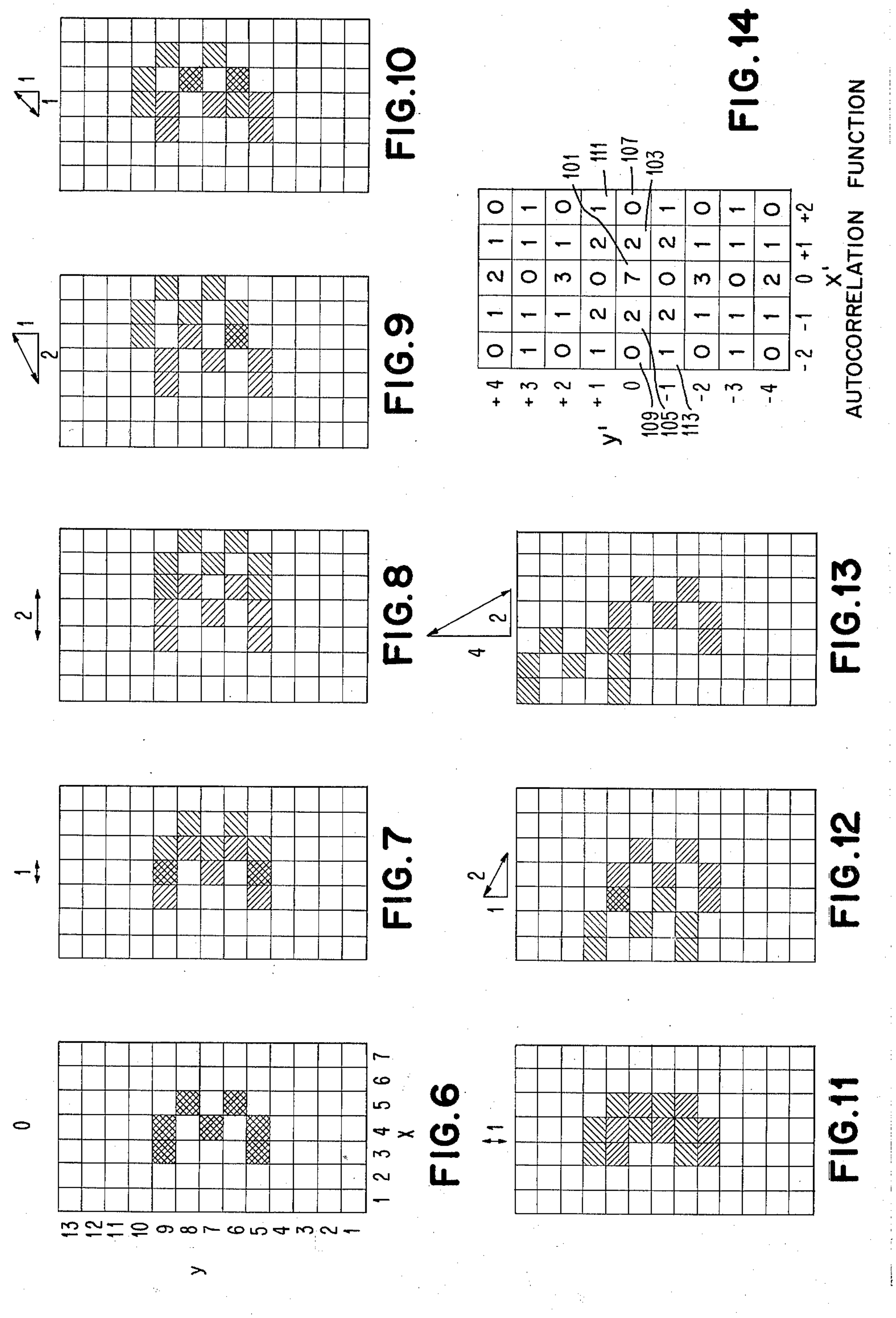
FIGURES 6–13 are a set of explanatory diagrams showing a procedure for generating the autocorrelation function of a typical specimen.
FIGURE 14 is a chart showing an autocorrelation function generated by following the procedure in FIGURES 6–13.

FIGURES 6 through 13 illustrate a method of generating the autocorrelation function shown in FIGURE 14 for a typical specimen pattern in the form of an Arabic numeral "3." The pattern comprises fifteen discrete areas on a three-by-five matrix for simplicity of arithmetic. In practice, this invention is designed to be used to identify specimens comprising many discrete areas on a large matrix.

The pattern "3" formed by slant-left lines is common to FIGURES 6 through 13; the pattern "3" formed by slant-right lines is shifted to various positions in the figures. FIGURE 6 illustrates the "0-shift" pattern, and hence, the slant-left and slant-right patterns are superimposed. If the discrete areas of the matrix are considered to have $x$ and $y$ coordinates, $f(x, y)$ is "1" for $(x=3, y=9)$; $(x=4, y=9)$; $(x=5, y=8)$; $(x=4, y=7)$; $(x=5, y=6)$; $(x=4, y=5)$; and $(x=3, y=5)$. For all other values of $x$ and $y$, $f(x, y)=0$. The autocorrelation function $D(x', y')$ is determined by the equation:

$$D(x', y')=\sum_{x,y} f(x, y)f(x+x', y+y')$$

In the "0-shift" condition (FIGURE 6), $x'=y'=0$ and the sum is merely a count of the number of areas that are filled by the pattern since the product $$f(x, y)f(x+0, y+0)=1$$

whenever $f(x, y)=1$. This sum is "7" for the pattern in FIGURE 6, and it is placed in the "0-shift" position 101 in the table in FIGURE 14. FIGURE 7 illustrates the conditions present for a shift of one unit to the right (designated as $x'=1$, $y'=0$), which causes a "2" to be placed at the corresponding position 103 of the table in FIGURE 14 as there are two coincident areas on the matrix. Position 103 is displaced one unit to the right of position 101 $(x'=1, y'=0)$ to correspond to a shift of one unit to the right of the pattern in FIGURE 7. FIGURE 8 shows a shift of two units to the right where there are no coincidences and, therefore, a zero is placed in position 107. A "2" is also placed in position 105 of the table as a shift to the left of one unit $(x'=-1, y'=0)$ obviously produces the same result as a shift to the right of one unit $(x'=1, y'=0)$. In a similar manner, positions 111 and 113 of the table are filled with "1's" as determined by FIGURE 9. FIGURES 10 through 13 illustrate the conditions present for several other combinations of $x'$ and $y'$ as indicated by the vector diagrams in the figures. Using this procedure the entire autocorrelation table of FIGURE 14 may be filled in for the typical pattern "3."

The autocorrelation function sums were manually generated, as described with respect to FIGURES 6 through 14, by shifting the specimen various amounts $(x', y')$ with respect to itself and checking for areas where the unshifted and shifted patterns coincided. The function may also be obtained by shifting vectors $(x', y')$ throughout the matrix (over all $x$, $y$) and checking for areas where both ends of the vectors coincide with areas of the specimen. This procedure is simulated in the embodiment shown in FIGURES 1 and 2. The digital input signals utilized in the FIGURE 3 embodiment may also be derived by this procedure from the shift register and AND gate arrangement disclosed in the co-pending application Serial No. 93,070.

Figure 1A:
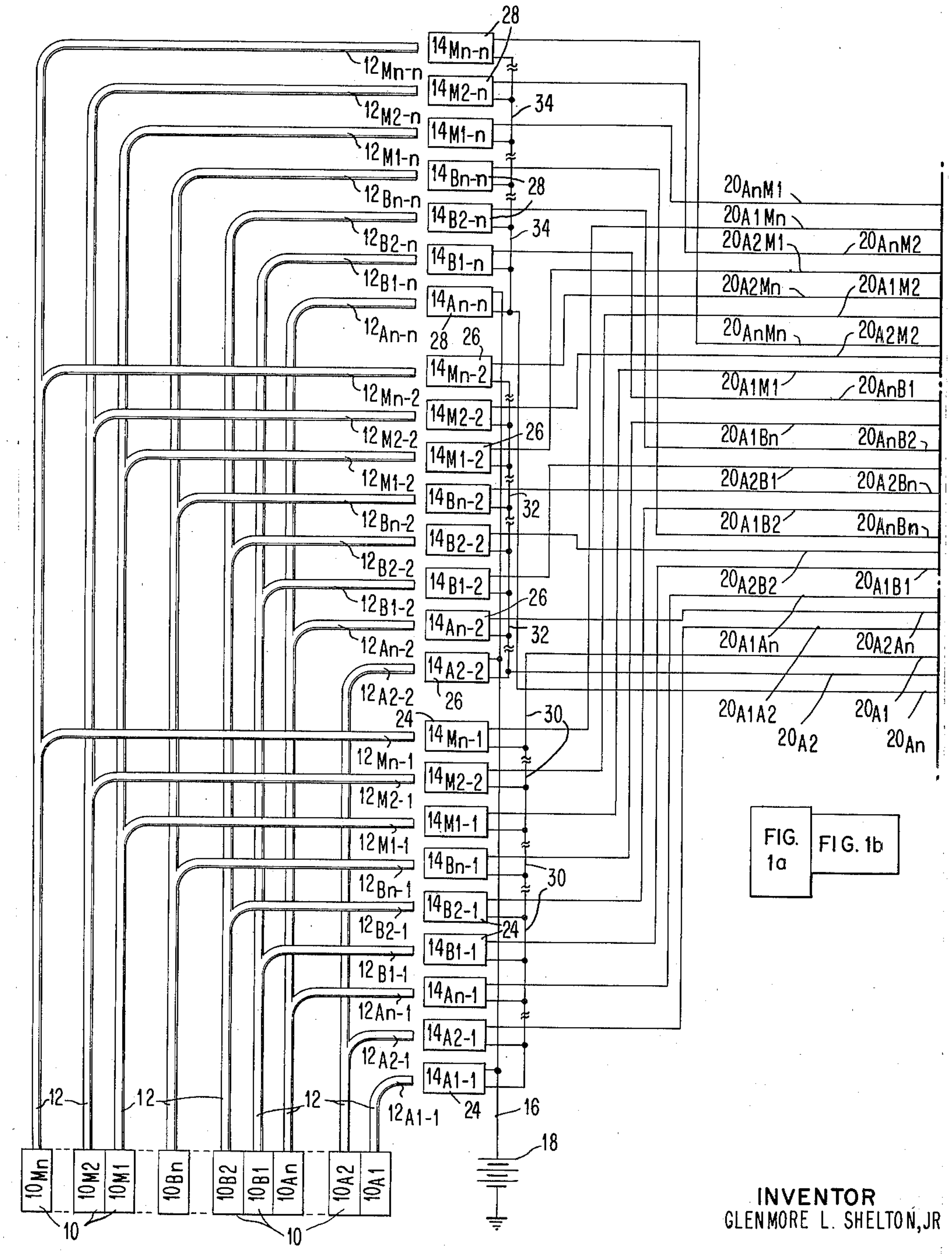
Figure 1C:
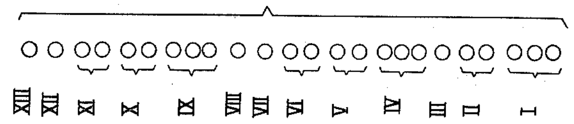
Figures 1B, 15:
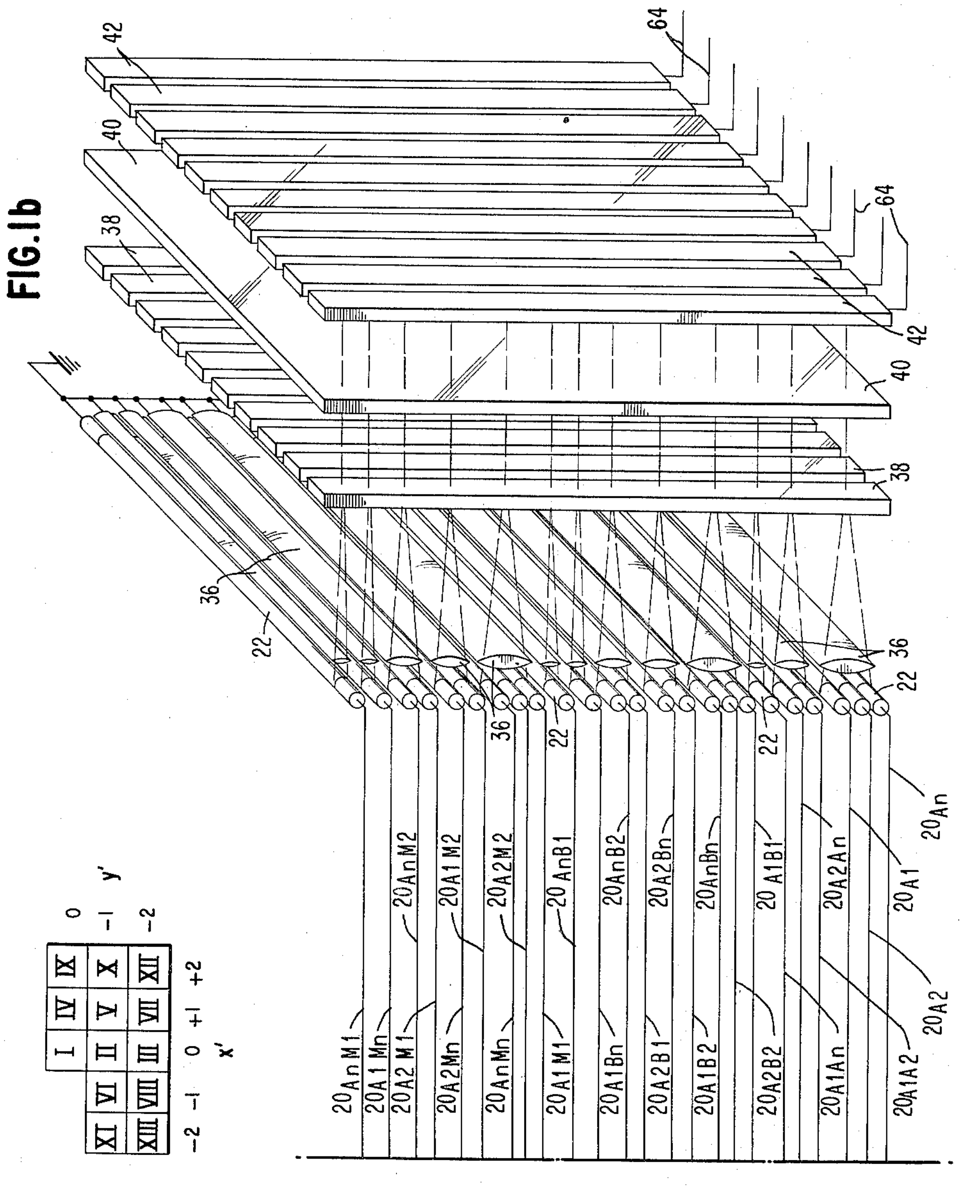
FIGURE 15 is a chart showing the relationship between FIGURES 1*c* and 14.

Let us now consider the first embodiment of the invention shown in FIGURES 1*a* and 1*b*. The ends of a plurality of light conducting rods 10 are labeled from the bottom to the top as $10_{A1}$, $10_{A2}$ . . . $10_{An}$, $10_{B1}$, $10_{B2}$ . . . $10_{Bn}$, $10_{M1}$, $10_{M2}$ . . . $10_{Mn}$. The rods may be made of Lucite, for example. Whereas the ends of rods $10_{A1, A2 \ldots Mn}$ are shown schematically in a linear relationship in FIGURE 1*a*, the actual arrangement of rods in a matrix to form an optical scanner is shown in FIGURE 2*a*. Appropriate break lines are shown in both FIGURES 1 and 2 to indicate that the scanning matrix formed by the rods 10 may be from one to M columns wide and one to *n* rows high. The number of light conducting rods 10 is determined by the size of the scanning matrix necessary to cover the specimen being sensed. It is also to be understood that the break lines in FIGURE 2*a* could be eliminated and the rods adjacent these lines considered to be in contact with each other to form a three-by-three or nine element matrix comprising nine Lucite rods 10. The same statement may be made concerning the diagrammatic arrangement shown in FIGURE 1, i.e., if the break lines are eliminated, then the resultant complete scanning and logical circuit arrangement is that required for a nine rod scanner sensing a three-by-three specimen.

Typical specimens are shown in FIGURES 2*a* and 2*b*. In FIGURE 2*a* there is shown a specimen 11 in the form of a common sized Arabic numeral "3" displayed on a fifteen element, three-by-five matrix which is moved relative to the scanning matrix 10. To sense specimen 11, light conducting rods 10 shown in FIGURES 1*a* and 2*a* would be arranged in a corresponding three-by-five matrix, i.e., the columns of rods would be labeled A, B and C and the rows numbered 1 through 5 inclusive, thereby resulting in a fifteen rod scanning matrix. Specimen 11 is shown as being white on a black matrix so that light from a source 13 is reflected therefrom to form a positive light image of specimen 11 on the ends of rods 10. However, as shown in FIGURE 2*b*, the specimen 15 may be black and the matrix white, in which case either a suitable image inversion means may be interposed between the specimen and rods 10 so that a positive light image is formed on rods 10 or else the electric outputs of photoconductive devices 14 may be inverted by suitable electric circuit means.

Figure 4A:
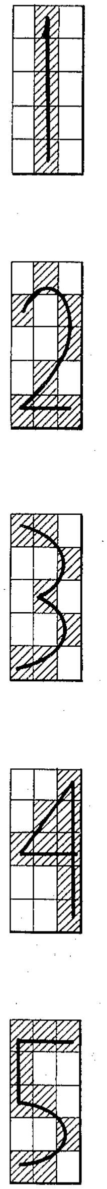
Figure 4B:
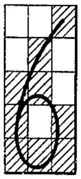
Figure 4B:
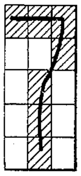
Figure 4B:
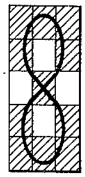
Figure 4B:
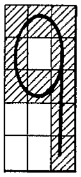
Figure 4B:
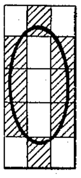

As mentioned previously, the light rod matrix 10 shown in FIGURES 1*a* and 2*a* may be considered as an actual nine rod matrix for scanning a three-by-three specimen 17 as shown in FIGURE 2*a* in the form of a white letter "F." The letter "F" may also be black as shown by specimen 19 in FIGURE 2*b* in which case an optical or electrical inversion means is required as has already been noted in connection with specimen 11. In the case of a nine-element specimen, the light rod matrix and the specimen matrix may be considered as having three columns designated as A, B and C and three rows designated as 1, 2 and 3. Other specimens may also be suitably resolved in a three-by-three matrix but, as a practical matter, such a matrix does not provide for a wide variety of specimens. However, the three-by-five matrix shown in conjunction with specimens 11 and 15 is quite versatile and FIGURES 4*a* and 4*b* show how ten Arabic numerals may be adequately resolved on such a matrix. Also shown in FIGURES 4*a* and 4*b* are actual and normalized autocorrelation charts which will be discussed below.

Let us now return to FIGURES 1*a* and 1*b*. For ease of understanding, the ends of light rods 10 have been enlarged. Except for rods $\mathbf{10}_{A1}$ and $\mathbf{10}_{A2}$, the rods 10 are each branched to form three parallel light conducting rod extensions which are systematically designated as $\mathbf{12}_{A1-1}$, $\mathbf{12}_{A2-1}$ . . . $\mathbf{12}_{An-1}$ . . . $\mathbf{12}_{A2-2}$ . . . $\mathbf{12}_{An-2}$, $\mathbf{12}_{B1-1}$, $\mathbf{12}_{B2-1}$ . . . $\mathbf{12}_{Bn-1}$ . . . $\mathbf{12}_{Mn-1}$ . . . $\mathbf{12}_{Mn-n}$. Placed adjacent the ends of rod extensions 12 are corresponding photoconductive elements 14 individually labeled in the same manner as extension 12. Each photoconductive element 14 is optically coupled to its corresponding rod extension 12, that is, it is energized by any light being conducted by the rod.

Let us now direct our attention to the manner in which the photoconductive elements 14 are interconnected. One side of each of the photoconductive elements $\mathbf{14}_{A1-1}$, $\mathbf{14}_{A2-1}$ . . . $\mathbf{14}_{An-n}$ is connected via a conductor 16 to a suitable power source such as a battery 18. The other side of each photoconductive elements, $$\mathbf{14}_{A1-1 \;.\;.\;.\; n-n}$$

is connected via a corresponding one of conductors 20 to a corresponding one of a plurality of elongated neon lamps 22. Neon lamps 22 serve as light transmitting devices and may also be suitable light valves which pass light when energized by the electrical signals appearing on conductors 20. It should be noted here that photoconductive elements 14 are divided into three groups indicated as 24, 26 and 28. The photoconductive elements $\mathbf{14}_{A1-1}$, $\mathbf{14}_{A2-2}$ . . . $\mathbf{14}_{An-n}$ are each connected to one side of the remaining photoconductive elements in its group via conductors 30, 32 and 34, respectively. The other side of each of these remaining photoconductive elements is connected via its corresponding conductor 20 to one of the neon glow tubes 22.

It can be seen from the manner in which photoconductive elements 14 are interconnected that they act as electrooptical AND gates to determine coincident occurrence of light in any one of the Lucite rods $\mathbf{10}_{A1}$, $\mathbf{10}_{A2}$ . . . $\mathbf{10}_{An}$ and any of the other rods 10. For example, if element $\mathbf{14}_{A1-1}$ is energized coincidentally with element $\mathbf{14}_{B2-1}$, then paths are formed between battery 18 and conductors $\mathbf{20}_{A1}$ and $\mathbf{20}_{A1-B2}$. Since the light in the rods is derived from the presence of a specimen in the matrix element corresponding to each rod, electric signals appearing on the outputs of photoconductive elements 14 are, in effect, a digital representation of a comparison of the elements in the A column of the specimen matrix with all the other elements in the matrix over all directions and distances. As described in detail in the copending applications Serial No. 93,070, filed March 3, 1961, and Serial No. 45,034, filed July 25, 1960, by Lawrence P. Horwitz and Glenmore L. Shelton, Jr., and assigned to the same assignee as the present invention, such a comparison is another way of comparing the specimen function with itself over all possible vector displacements. Or in other words, such a comparison results in the generation of digitized electric signals representing the component elements of the autocorrelation function of the specimen which are then combined to produce digitized signals representing grouped or partially summed component elements.

The symbols appearing on conductors 20 in FIGURES 1*a* and 1*b* prior to their connection with neon lamps 22 indicate the AND functions represented by the appearance of signals on those conductors; that is, each symbol indicates a coincidence of an A column element of matrix 10 with another element in the matrix. As mentioned above, the electric signals carried by conductors 20 correspond to the component elements of the digitized autocorrelation function of the specimen scanned by the rods 10. The component elements are combined to form groups or partial sums by appropriately grouping lamps 22 and collecting or summing the light emanating therefrom. The lamp grouping is shown in FIGURE 1*c*. All lamps 22 connected directly to photoconductive elements $\mathbf{14}_{A1-1}$, $\mathbf{14}_{A2-2}$ . . . $\mathbf{14}_{An-n}$ via conductors 30, 32 . . . 34, respectively, form Group I, Group II contains all lamps 22 representing the presence of the specimen in the matrix elements adjacent to column A. Groups III through XIII represent other vector displacements from each element of column A. Thirteen corresponding condensing lenses 36 collect or sum the light from the thirteen groups of lamps 22 and focus thirteen light beams on a plurality of positive transparencies or masks 38 each containing a reference autocorrelation function in the form of thirteen horizontal zones which vary in degree of light transmissibility or transparency.

As can be seen from FIGURE 1, thirteen groups of lamps 22 are needed for the three-by-three nine element matrix composed of light conducting rods 10. The light focused by each of the condensing lenses 36 represents a partial or group sum and is directed to transmission masks 38. In an apparatus for recognizing the ten Arabic numerals, ten masks 38 are required. The light passed by each of masks 38 represents a group sum multiplied by the transmission coefficient of the mask, i.e., a group product. This light passes through masks 38 during the specimen scanning time and is then stored or integrated in time by a phosphor sheet 40. The stored light represents the sum of all thirteen group products for any particular specimen. Ten photoelectric strip detectors 42 are placed adjacent the phosphor sheet to produce ten electrical signals each indicative of the amount of light passed by its corresponding mask. As previously explained, the mask 38 most closely matching the analog light pattern from lenses 36 passes the greatest amount of light. The phosphor sheet 40 performs the time integration function and the intensities of the stored light for each specimen are proportional to the numerical values in one of the reference autocorrelation tables in FIGURES 4*a* and 4*b*. These electrical signals may then be applied to a maximum signal indicator 66, shown in detail in FIGURE 16, to produce a single output which identifies the mask 38 most closely matching the specimen autocorrelation function, thereby identifying the specimen.

It is obvious that positions of mask 38 and phosphor sheet 40 could be interchanged in which case the partial or group sums would be completely summed or integrated in time. Sheet 40 would then store the total light representing the sum of all the component elements of the specimen autocorrelation function, thereby being proportional to the mathematical expression for an autocorrelation function as defined above. This total light would then pass through, and be multiplied by, the reference masks 38. These arrangements are fully equivalent and merely interchange the addition and multiplying steps. In the embodiment shown in FIGURE 1, the light stored in sheet 40 actually represents the cross-correlation functions of the specimen and the reference masks and the component elements (or partial sums thereof) of the specimen autocorrelation function are actually multiplied by the reference masks.

Even though FIGURE 3 refers to the second embodiment of this invention, the arrangement of light transmission devices, reference masks, detectors, etc. is the same for both embodiments. Whereas in the first embodiment the digital electrical signals representing the component elements of the specimen autocorrelation function and applied to lamps 22 are converted to optical signals representing partially summed component elements by virtue of the grouping of the lamps 22 and the action of condensing lenses 36, in the second embodiment the light transmitted by the corresponding light transmitting devices 50 remains in the ungrouped component element form and corresponds on a one-to-one basis with the electrical signal inputs which represent the component elements of the specimen autocorrelation function.

In FIGURE 3, a plurality of light transmitting devices in the form of electrooptic light gates 50, such as Kerr cells, are interposed between a uniform light source 52 and a plurality of transmission masks 54 each containing a digitized reference pattern of a reference autocorrelation function. A plurality of input conductors 56 carry electrical digital signals which drive the light gates 50, each of which passes light from source 52 when its corresponding conductor 56 carries an electrical pulse. The signals are applied in parallel to gates 50 and represent the component elements of a digitized autocorrelation function of a specimen to be identified. These signals may be derived from the autocorrelation function generator including a shift register and AND gate arrangement as shown in co-pending application Serial No. 93,070 wherein the discrete areas of the specimen matrix are scanned a single area at a time (rather than a column at a time as in the first embodiment) to produce signals which are logically combined to form the component elements of the specimen autocorrelation function. These component elements may also be derived from the signals appearing on conductors 20 of the first embodiment shown in FIGURES 1*a* and 1*b*. The conductors 20 fall into thirteen groups corresponding to the thirteen lenses 36. The conductors 20 in each group may be connected to a common conductor, thereby providing thirteen common conductors, which would be connected to thirteen of the input conductors 56 in FIGURE 3. In each group containing more than one of the conductors 20, different electrical delays must be introduced in the other conductors 20 in order to separate otherwise coincident light signals which would occur because of the column or parallel scanning provided by light rods 10. In this case, only thirteen lamps 22 or light gates 50 are required as compared with the twenty-four lamps required in the FIGURES 1*a* and 1*b* embodiment. However, a longer period of time is required to sum or integrate these component element light signals which are more numerous than the partial or group sum signals which are summed in the FIGURE 1 embodiment.

It is to be understood that the signals appearing on conductor 56 may be derived from any source so long as they represent in digital form the component elements autocorrelation function of a specimen to be identified. It is also to be understood that the electrooptic light gates may be replaced by other suitable light transmitting devices such as neon lamps, field stimulated phosphors, transistor display bulbs, etc.

If the conductors 56 are considered to be carrying the digital (binary) outputs from the twenty-three AND gates in co-pending application Serial No. 93,070, then there would be twenty-three conductors. Conductors 56 and light gates 50 have been labeled to correspond with the outputs from those AND gates. The light transmitted by light gates 50 is directed upon optical transmission masks 54A, B . . . I, J, each of which contains a digitized reference autocorrelation function pattern. When used in conjunction with the twenty-three AND gate outputs, these reference patterns each comprises twenty-three bands or zones 58, labeled 0 to 22 whose transparency is in accordance with the digitized autocorrelation function of the particular reference represented by each mask as described in connection with masks 38 in FIGURE 1*b*.

In both the FIGURE 1 and the FIGURE 3 embodiments, the respective light transmission masks 38 and 54 function in such a manner that the mask most closely matching the optical pattern transmitted by light transmitting devices 22 and 50, respectively, passes the most light. The reference masks also have the effect of optically multiplying the light passing therethrough. In FIGURE 3, this light is then directed upon a phosphor sheet 60 which stores and sums the light transmitted by the transmission masks. Phosphor sheet 60 may be considered to have ten vertical portions A, B . . . I, J to correspond with the ten masks 54A, B . . . I, J. The summed light stored by sheet 60 is then directed upon a plurality of photoconductive strip detectors 62 which function to provide electrical signals proportional to the intensity of the light impinging thereupon. The electrical signals $e_A$, $e_B$ . . . $e_I$, $e_J$ are then applied via conductors 64 to the input of a maximum signal indicator 66 which provides an output signal indicative of the largest of the signals $e_{A, B \ldots}$ $e_{I, J}$.

It is understood that the storage phosphor, which performs the integration required by the mathematical expression for an autocorrelation function, could be eliminated and suitable electrical integrating circuits connected to the outputs of strip detectors 62. Furthermore, the comparison of the reference masks optical patterns formed by the light transmitting devices 22 and 50 must be normalized to assure that the matching mask transmits the most light. Normalized masks as described in co-pending application Serial No. 45,034 or normalizing potentiometers connected to the outputs of photo detectors 42 and 62 as described in co-pending application Serial No. 143,181, filed October 5, 1961, by Glenmore L. Shelton, Jr. and assigned to the same assignee as the instant application, may be used.

The transparency of the horizontal zones contained in masks 38 and 54 is in proportion to the numerical values shown in the autocorrelation charts $D_R(x', y')$ in FIGURES 4*a* and 4*b* or, in the case of normalized masks, with the numbers of the normalized charts $Z_R(x', y')$.

FIGURE 15 is a chart showing the actual correspondence between the thirteen groups of lamps 22 and the numerical values appearing in the autocorrelation chart of FIGURE 14. Because of the symmetry of the autocorrelation chart, only the lower half is shown. Only thirteen positions in the chart are required for a three-by-three specimen matrix whereas twenty-three are required for a three-by-five specimen; therefore, the chart in FIGURE 15 does not contain positions corresponding to the two lower rows in FIGURE 14.

When normalizing potentiometers are used, for example, the masks are not normalized themselves and are made by photographing the light intensity patterns formed on phosphor sheet 40 when the known reference characters are each scanned by rod matrix 10 with no masks in the system. The light intensities of the thirteen zones of each reference pattern are proportional to the numerical values in the autocorrelation tables shown in FIGURES 4*a* and 4*b*. The light transmitted by lamps 22 is integrated in time or stored by phosphor 40 to produce light intensity patterns corresponding to the autocorrelation function of each specimen scanned by rod matrix 10.

Figure 5:
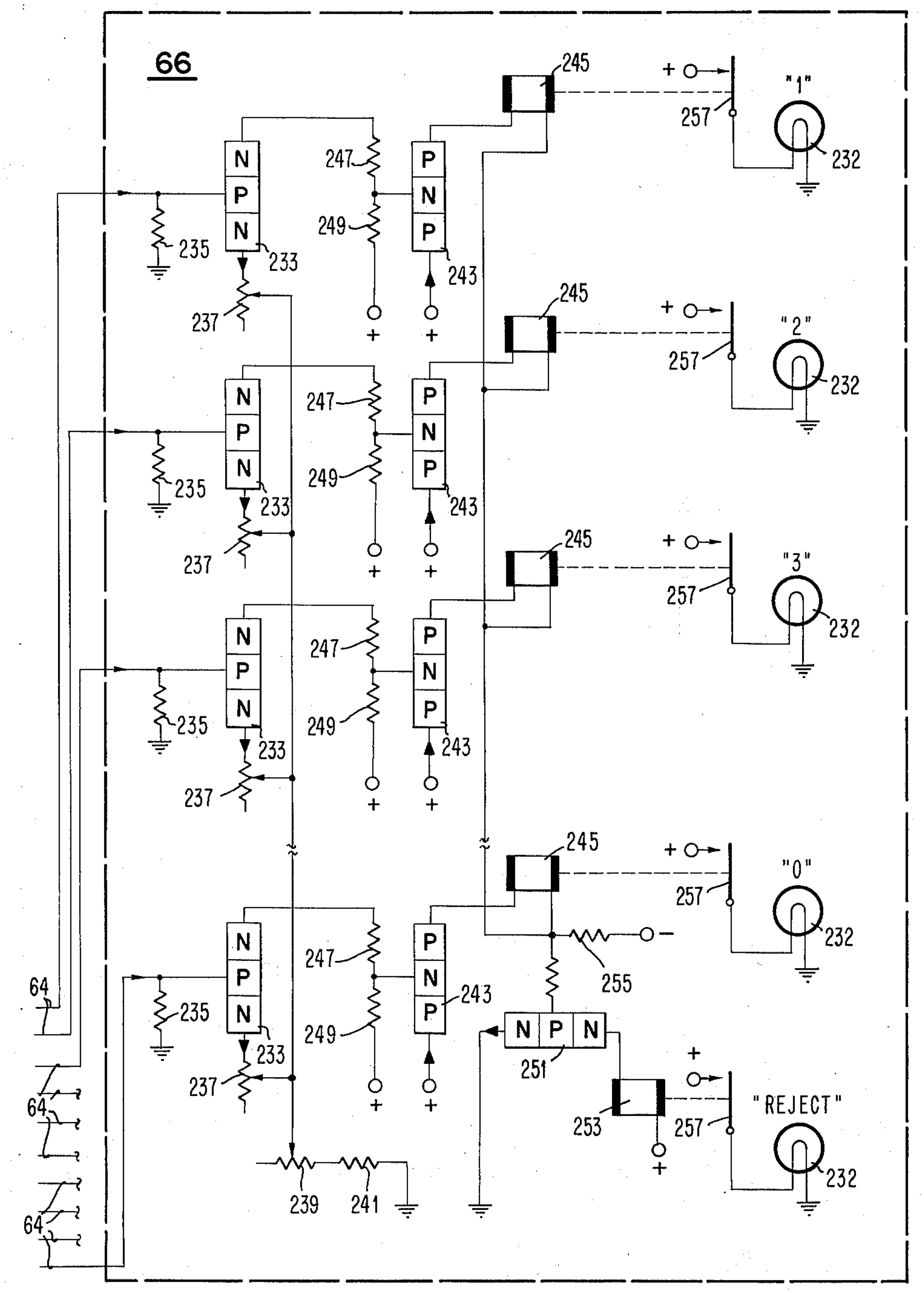
FIGURE 5 shows a specific maximum signal indicator for use with the specimen identification apparatus illustrated in FIGURES 1 and 3.

In FIGURE 5, there is shown a suitable maximum signal indicator 66 which accepts voltages present on conductors 64 and causes an output indicator lamp 232 to be lighted as an indication of the identity of the specimen. One of the indicator lamps 232 functions as a reject indicator and is lighted if the largest input signal is not sufficiently greater than the second largest signal.

The input signals are applied to the base connections of a group of NPN type transistors 233. Each transistor base circuit includes a resistor 235 to protect the transistor in the case of a disconnected input signal. The emitter-base connection of the transistors provides a diode action that, in conjunction with resistors 237 and a common path for current including resistors 239 and 241, permits current flow only to the transistor base to which the most positive signal is applied. The voltage drop across resistors 239 and 241 back-biases the transistors 233 associated with the less positive input signals, thereby preventing current flow in their base circuits. The sensitivity of the circuit is defined as the amount by which the most positive input signal must exceed the adjacent signal (second most positive signal) to back-bias the transistor associated with the latter signal. The sensitivity is controlled by the setting of resistor 239. Resistors 237 are adjusted to provide a constant and equal emitter resistance for all of the transistors 233 regardless of the setting of resistor 239. As the common resistance in the emitter circuits is varied by a change in the setting of resistor 239, the settings of resistors 237 are changed in the opposite direction to maintain a constant total emitter resistance. Resistors 237 may be controlled simultaneously with control of resistor 239 by the use of a common control shaft. The minimum common resistance in the emitter circuit is determined by the fixed resistor 241. If the resistance of resistor 241 is labeled $R_{241}$, the active resistance of resistor 239 is labeled $R_{239}$, the active resistance of resistor 237 is labeled $R_{237}$ and the emitter-base resistance of a transistor 233 is labeled $R_{233}$, then the smallest ratio between the amplitudes of the most positive signal $e_I$ and the adjacent signal $e_J$ that may be tolerated without indicating a reject is approximately:

$$\frac{R_{233}+R_{237}+R_{239}+R_{241}}{R_{239}+R_{241}}$$

Only the transistors 233 associated with the most positive input signals are permitted to conduct if the most positive signal exceeds the adjacent signal by an amount greater than the sensitivity of the system.

The output of the conducting transistor 233 is applied to an associated PNP transistor switch 243 which, in turn, provides current to operate a relay 245 associated with the largest input signal. A group of resistors 247 provide protection for transistors 233 and 243. A second group of resistors 249 provide paths for leakage current in the base circuits of transistors 243.

A reject circuit containing a transistor 251 and the reject relay 253 operates when the largest two or more applied signals are approximately equal. This condition causes two or more relays 245 to operate. Transistor 251 is ordinarily non-conducting due to the negative voltage at its base which is equal to the supply voltage applied to a resistor 255 less the voltage drop across the resistor. When two or more relays 245 are operated simultaneously, a sufficient current flows in resistor 255 to provide to the base of transistor 251 a voltage which is sufficiently high to render the transistor conducting and operate relay 253. Each relay has contacts 257 which control the operation of an indicator 232.

The foregoing description explains in detail how a specimen may be optically sensed in parallel, a column at a time, in a manner which is an improvement over the element by element or series type sensing disclosed in copending application Serial No. 93,070. Furthermore, this invention provides electrooptic means connected in a logical manner for providing a digitized electrical output representative of component elements of the autocorrelation function of a specimen to be identified. The invention further provides means for coupling the digitized signals to an optical system comprising a plurality of light transmitting devices which are selectively energized in accordance with the digitized signals. These optical signals representing the component elements, or group or partial sums thereof, are compared with digitized optical reference autocorrelation functions to identify the specimen.

While there have been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. Specimen identification apparatus comprising a plurality of input terminals adapted to be connected in parallel to a source of digital electrical signals corresponding to component elements of the autocorrelation function of a specimen to be identified, a plurality of light transmitting devices each coupled to a corresponding one of said input terminals, a plurality of masks each containing a digitized optical pattern indicative of a reference autocorrelation function, each of said transmitting devices being responsive to the presence of a digital signal on its corresponding input terminal to transmit light through said plurality of masks, the light transmitted by said transmitting devices forming a digitized optical pattern indicative of the component elements of the autocorrelation function of said specimen, and means responsive to the light passed by said masks to identify the mask passing the greatest amount of light, thereby identifying said specimen.

2. Specimen identification apparatus as defined in claim 1 wherein said light transmitting devices are arranged in groups each of which produces a light intensity corresponding to the sum of the light produced by the associated transmitting devices simultaneously responding to the digital input signals, the light from said groups forming an optical pattern of zones of light intensity in accordance with partial sums of the component elements of said specimen autocorrelation function, said digitized pattern in each of said masks containing zones whose light transmissibility is in accordance with its corresponding reference autocorrelation function.

3. Specimen identification apparatus as defined in claim 1 wherein said specimen is formed within a matrix having M columns and $n$ rows, said matrix having $M \times n$ matrix elements, means for optically sensing said specimen in parallel a column at a time, a plurality of logically interconnected light responsive AND circuits logically coupled to said sensing means to produce said digital signals corresponding to said component elements of the autocorrelation function of said specimen.

4. Specimen identification apparatus as defined in claim 3 wherein said optical sensing means includes $M \times n$ light conducting rods arranged in M columns and $n$ rows, said rods being branched to form plural extensions which are optically coupled to said light responsive AND circuits in a logical manner.

5. Specimen identification apparatus comprising means for generating a plurality of electric signals corresponding to component elements of an autocorrelation function of a specimen to be identified, a plurality of light transmitting devices each being coupled to a corresponding one of said signals, said light transmitting devices being responsive to said signals to transmit light which forms an optical pattern of said component elements of said specimen autocorrelation function, a plurality of digitized reference autocorrelation function patterns, and means for optically comparing said optical pattern with said plurality of reference patterns to identify said specimen.

6. Specimen identification apparatus as defined in claim 5 wherein said transmitting devices are lamps energized by said signals.

7. Specimen identification apparatus as defined in claim 5 wherein said light transmitting devices are light valves responsive to said signals and further comprising a source of continuous light, said valves being located between said source and said reference patterns.

8. Specimen identification apparatus comprising means for generating a series of digital electrical pulses corresponding to the component elements of a one dimensional digital autocorrelation function of a two dimensional specimen to be identified, a plurality of light transmitting devices, means coupling each of said digital pulses to a corresponding one of said light transmitting devices, each transmitting device being operative to transmit light upon the receipt of a pulse, the light transmitted by said devices forming an optical pattern corresponding to said component elements of said specimen autocorrelation function, a plurality of reference autocorrelation functions in the path of said optical pattern for optically comparing the elements of said specimen autocorrelation function and said plurality of reference patterns, whereby more light passes through the reference pattern most closely matching said specimen pattern than through the other reference patterns, means for storing the elemental amounts of light passing through said reference patterns, and photoelectric means responsive to the stored light associated with each reference pattern for generating an electric signal indicative of the reference pattern passing the most light.

9. Specimen identification apparatus for identifying a specimen which is contained within a rectangular matrix having M columns and $n$ rows, and thereby $M \times n$ matrix elements, said apparatus comprising a plurality of light conducting elements for optically scanning said character, said elements being arranged in an $M \times n$ matrix, a plurality of photoelectric devices, means for logically coupling said photoelectric devices to said light conducting elements, said matrix being scanned in parallel a complete column at a time so that the appearance of a specimen in a matrix element causes light to be conducted by the corresponding light conducting element and thereby optically coupled to at least one of said photoelectric devices, means interconnecting the outputs of said photoelectric devices in a logical manner, whereby the output signals produced by said photoelectric devices represent component elements of the digitized autocorrelation function of said specimen, a plurality of light transmitting devices, means for coupling said output signals to said light transmitting devices to form a light pattern corresponding to said component elements of said specimen autocorrelation function, a plurality of reference autocorrelation function patterns, and means to compare said light pattern with said plurality of reference patterns to identify said specimen.

10. Specimen identification apparatus as defined in claim 1 wherein said light responsive means comprises light storage means for storing and summing the elemental amounts of light passed by said masks, and photoelectric means responsive to the stored light to produce an electrical signal to identify the mask passing the greatest amount of light.

References Cited by the Examiner

UNITED STATES PATENTS

| | | | |
|---|---|---|---|
| 2,888,672 | 5/1959 | Young | 340—347 |
| 3,046,540 | 7/1962 | Litz et al. | 340—347 |
| 3,064,519 | 11/1962 | Shelton | 340—146.3 |

MALCOLM A. MORRISON, *Primary Examiner.*